US012395398B2

(12) United States Patent
Titon et al.

(10) Patent No.: US 12,395,398 B2
(45) Date of Patent: Aug. 19, 2025

(54) ASSIGNING A RELEVANCE SCORE TO A NEW METRIC USING NATURAL LANGUAGE PROCESSING

(71) Applicant: MICROSOFT TECHNOLOGY LICENSING, LLC, Redmond, WA (US)

(72) Inventors: Myriam Titon, Jerusalem (IL); Jeremy Samama, Herzliya (IL); Rachel Lemberg, Herzliya (IL); Yaniv Lavi, Tel Aviv-Jaffa (IL); Hagit Grushka, Lehavim (IL); Michael Tony Alburquerque, Tel-Aviv (IL); Eliya Habba, Petah Tikva (IL); Dor Grynshpan, Ramat Gan (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 81 days.

(21) Appl. No.: 18/524,683

(22) Filed: Nov. 30, 2023

(65) Prior Publication Data
US 2025/0112816 A1 Apr. 3, 2025

Related U.S. Application Data

(60) Provisional application No. 63/586,626, filed on Sep. 29, 2023.

(51) Int. Cl.
*H04L 41/0631* (2022.01)
*G06F 40/20* (2020.01)
*H04L 41/16* (2022.01)

(52) U.S. Cl.
CPC ............ *H04L 41/064* (2013.01); *G06F 40/20* (2020.01); *H04L 41/16* (2013.01)

(58) Field of Classification Search
CPC ........ G06F 40/20; H04L 41/064; H04L 41/16
See application file for complete search history.

(56) References Cited

U.S. PATENT DOCUMENTS

| | | | |
|---|---|---|---|
| 11,188,550 B2 * | 11/2021 | Haggie | ................ G06F 16/25 |
| 2022/0358005 A1 | 11/2022 | Saha | |
| 2023/0306206 A1 * | 9/2023 | Dutta | .................... G06F 40/30 |

OTHER PUBLICATIONS

Angelica Salas et al. "Incident Detection Using Data from Social Media", 2017 IEEE 20th International Conference on Intelligent Transportation Systems (ITSC) Workshop, 5 pages. (Year: 2017).*

(Continued)

*Primary Examiner* — G. C. Neurauter, Jr.
(74) *Attorney, Agent, or Firm* — Newport IP, LLC; Jacob P. Rohwer

(57) ABSTRACT

Disclosed herein is a system for determining scores that are usable to filter a larger set of metrics (e.g., thousands of metrics) down to a smaller set of relevant metrics (e.g., hundreds of metrics) that can be more efficiently queried and ingested for root-cause analysis of an incident. During a training stage, the system analyzes known incidents and converts the names of the metrics, as described via customer-defined words, into mathematical representations (e.g., word embedding featurization vectors). When a new metric with a new name is received for a new incident, the system implements an incident inference stage during which the new name is converted into a new mathematical representation. The system compares the new mathematical representation to the mathematical representations to identify a similar mathematical representation. The system retrieves the score for the metric associated with the similar mathematical representation and assigns the retrieved score to the new metric.

20 Claims, 8 Drawing Sheets

(56) References Cited

OTHER PUBLICATIONS

U.S. Appl. No. 63/586,626, filed Sep. 29, 2023.
International Search Report and Written Opinion received for PCT Application No. PCT/US2024/046292, Dec. 11, 2024, 16 pages.
Kan, et al., "Contrastive Bayesian Analysis for Deep Metric Learning", In Repository of arXiv:2210.04402v2, Nov. 7, 2022, 18 Pages.

* cited by examiner

ASSIGNING A RELEVANCE SCORE TO A NEW METRIC USING NATURAL LANGUAGE PROCESSING

PRIORITY APPLICATION

This application claims the benefit of and priority to U.S. Provisional Patent Application No. 63/586,626, filed Sep. 29, 2023, the entire contents of which are incorporated herein by reference.

BACKGROUND

As cloud computing rapidly gains popularity, more and more data and/or services are stored and/or provided via network connections. Providing an optimal and reliable customer experience is an important aspect for cloud providers that host services via cloud platforms (e.g., AMAZON WEB SERVICES, GOOGLE CLOUD PLATFORM, MICROSOFT AZURE). A cloud provider is the operator of a cloud platform. A tenant is a customer of the cloud provider that uses a cloud platform to provide a service to thousands or millions of end users geographically dispersed around a country, or even the world.

In various scenarios, the cloud provider can provision an application for use by different customers within separate workspaces. A workspace is a logical unit that belongs to the customer and that enables the customer to efficiently configure resources, manage applications, and execute services in a customized and secure manner. In one example, the cloud provider can provision the application to separate workspaces via a container-based orchestration process (e.g., KUBERNETES). Often, execution of the application in a workspace may be disrupted by an incident that negatively affects the performance of the application within the workspace and/or the security provided by the application within the workspace. When an incident occurs, the cloud provider is often required, e.g., in accordance with various service level agreements (SLAs), to investigate the incident and perform root-cause analysis.

In order to perform the root-cause analysis, an operator of the cloud platform implements a system configured to query and/or ingest metrics from resources within the workspace (e.g., KUBERNETES nodes and/or clusters) in which the incident occurs. The metrics reflect a state of the application and/or the infrastructure used to execute the application. Consequently, the metrics are analyzed by systems and/or users to perform the root-cause analysis.

Analyzing the metrics associated with an incident is a resource intensive, and thus, expensive task due to the large number of metrics that is available to be queried and ingested by the system. For instance, thousands of metrics are collected within the customer workspaces and are available for querying and ingestion. Consequently, it takes the cloud provider an unreasonable amount of time (e.g., over thirty minutes, an hour) to provide the results (e.g., the likely root cause of the incident) of the root-cause analysis if the all the available metrics are queried and ingested for analysis.

To shorten the amount of time it typically takes to provide the results of the root-cause analysis, the cloud provider attempts to identify a smaller set of more relevant metrics (e.g., hundreds of metrics rather than thousands of metrics) for querying, ingestion, and analysis purposes. However, identifying a smaller set of more relevant metrics has proven to be a difficult task for cloud provider. One reason the task is difficult is different customers use different names (e.g., descriptions using words or other string(s) of alphanumeric characters) to define the same or similar metrics for the application executing within their own workspace. For instance, a first customer may define a metric as "http_failed_requests_count" in their workspace while a second customer may define the same metric as "http_incomplete_requests_count".

Consequently, it is difficult for the cloud provider to learn which smaller set of metrics is relevant to an incident that occurs in a first workspace so that the same smaller set of relevant metrics can be queried and ingested in response to a similar incident of the same type that occurs in a second workspace. It is with respect to these and other considerations that the disclosure made herein is presented.

SUMMARY

The system disclosed herein addresses the challenges described above, among others, by determining scores that are usable to filter a larger set of metrics (e.g., thousands of metrics) down to a smaller set of relevant metrics (e.g., hundreds of metrics) that can be more efficiently queried and ingested when a particular type of incident occurs. To determine the scores, the system implements a training stage during which the system analyzes known incidents of the particular type. Moreover, the system converts the names of the metrics, as defined by customer-defined words or string(s) of alphanumeric characters that describe the metrics, into mathematical representations (e.g., word embedding featurization vectors).

When a new metric with a new name is received in association with a new incident of the particular type, the system implements an incident inference stage during which the new name is also converted into a new mathematical representation. The system then compares the new mathematical representation to the mathematical representations generated during the training stage to identify a similar mathematical representation. The system then retrieves the score for the metric associated with the similar mathematical representation and assigns the retrieved score to the new metric. The term "new" in this context reflects the fact that the information is not included in or part of the training stage.

As described herein, the known incidents occur within a workspace of a customer. Moreover, the known incidents can be of a particular type of incident. For example, a first type of incident may be related to security. A second type of incident may be related to networking and the transmission of data. A third type of incident may be related to the processing of data and execution environments. A fourth type of incident may be related to the storage and maintenance of data. These example types of incidents are non-exhaustive, and the techniques described herein can be applied to other types of incidents. Further, an incident can be classified in more than one type (e.g., a storage incident can also be a security incident). The system is configured to access data associated with the known incidents to implement the training stage. The data includes respective times at which the incidents occur (e.g., captured by timestamps), respective values (e.g., time-series values) for the metrics, and respective names for the metrics as defined by the customer (e.g., an Information Technology (IT) representative of the customer).

Using the accessed data associated with the known incidents, the system generates training data useable to determine a score for each of the metrics. As described above, the score indicates the relevance of a metric to a particular type of incident. More specifically, the system generates the training data by determining, for each known incident, whether a value for each metric is above or below a threshold value within a predefined time period immediately before a time at which the incident occurs. In one example, this predefined time period is from two to six hours. During this predefined time period there is an expectation that the values of a metric that is relevant to the incident would behave in an abnormal, or anomalous, manner. Stated alternatively, there is an expectation that the values of a metric that is relevant to the incident would spike above a higher threshold value established for the metric and/or dip below a lower threshold value established for the metric. If the values of the metric are determined to be above or below one of the threshold value(s) within the predefined time period, the system adds the metric to a positive dataset in the training data.

Similarly, the system generates the training data by determining, for each known incident, whether a value for each metric is above or below a threshold value during another predefined time period immediately before the predefined time period discussed in the preceding paragraph. In one example, this other predefined time period is from two to six hours. In another example, this other predefined time period can be from one to three days. During this other predefined time period, there is an expectation that the values of a metric that is relevant to the incident would behave in a normal, or non-anomalous, manner. Stated alternatively, there is an expectation that the values of a metric that is relevant to the incident would not spike above a higher threshold value established for the metric and/or would not dip below a lower threshold value established for the metric. If the values of the metric are determined to be above or below a threshold value within this other predefined time period, the system adds the metric to a negative dataset in the training data. The predefined time periods described above can be established based on the particular type of incident, and thus, can vary from one type of incident to the next. It is noted that a metric can be added to both the positive dataset and the negative dataset (e.g., if the metric spikes and/or dips in both predefined time periods discussed above).

The system can execute an anomaly detection algorithm to determine whether a value for a specific metric is above or below a threshold value. Accordingly, the thresholds and threshold values are established for individual metrics. In one example, the anomaly detection algorithm is a dynamic anomaly detection algorithm that implements time-based adjustments to a range of accepted or expected values for a metric over time by learning the aforementioned higher threshold value to define the top of the range and the aforementioned lower threshold value to define the bottom of the range. In another example, the anomaly detection algorithm can use static thresholds to define the top and the bottom of the range.

Now that the system has a positive dataset and a negative dataset in the training data, the system can analyze the training data to determine the relevance of individual metrics to a particular type of incident, which is captured by scores. In one example, the system determines a precision parameter and a recall parameter for each metric. The precision parameter is a fraction represented by a number of times a metric is seen in the positive dataset over a total number of times the metric is seen in both the positive dataset and negative dataset. The recall parameter is a fraction represented by a number of times a metric is seen in the positive dataset over a total number of known incidents analyzed. The system then combines the precision parameter (Precision) and recall parameter (Recall) into a score for each metric. In one example, the score is an F-score that balances both precision and recall and is calculated as: F-score=2*(Precision*Recall)/(Precision+Recall).

As described above, in the context of different workspaces for different customers, names for the same or similar metrics that reflect the status of the same application may be vastly different as they are defined by different users. For instance, one workspace may broadly name a metric as "error_count" while another workspace may capture "error_count" based on type via more granular names as follows:
"afss_file_fetch_error_count",
"configmanager_activateconfigsetrevision_error_count_total", and
"configmanager_createconfigset_error_count_total".

Accordingly, the system uses a natural language processing model to represent the names of the metrics mathematically, e.g., via a word embedding featurization vector. The natural language processing model can use a natural language processing algorithm such as term frequency-inverse document frequency (TF-IDF), FastText, One Hot Encoding, Word2Vec, and so forth. Accordingly, the natural language processing model can be trained to map words and/or other strings of alphanumeric characters used to define a metric name to a linguistic context and to produce a vector space that includes the word embedding featurization vectors. The word embedding featurization vectors are positioned, in the vector space, so that names that are more likely to share common linguistic contexts are located in close proximity to one another. Consequently, the natural language processing model is configured to map different, but similar names to the same linguistic context.

When a new metric with a new name is received in association with a new incident of the particular type, the system implements an incident inference stage that calls on the natural language processing model to convert the new name into a new mathematical representation. The system then compares the new mathematical representation for the new name of the new metric to the mathematical representations of the metrics that have already been scored during the training stage. The comparison identifies a similar mathematical representation for the new mathematical representation. The system can then retrieve a score for the metric associated with the similar mathematical representation and assign the score to the new metric.

In various examples, new metrics with new names are received from a customer workspace that is different than a customer workspace from which the known incidents were received and analyzed. Consequently, the system described herein can efficiently assign scores to the new metrics with new names in a new customer workspace without having to implement the training stage described above. This enables the system to efficiently rank the new metrics based on relevance (e.g., the assigned scores) to the particular type of incident and to use the ranking to filter a larger set of metrics down to a smaller set of metrics that are relevant to the particular type of incident. For example, the system can use a threshold score (e.g., a score over 0.90, 0.80, 0.75, and so forth) and/or a threshold number N (e.g., the top N=100 scored metrics, the top N=200 scored metrics, the top N=300 scored metrics, and so forth) to determine the smaller set of relevant metrics. The system can then focus the querying and ingestion of metrics to this smaller set in order to improve the response time to return results of the root-cause analysis.

Consequently, the system described herein address the challenges presented when the names of the same or similar metrics vary from one customer workspace to another and/or when a number of customers for which there is data for the training stage is limited. Moreover, because the system is fully automated (e.g., does not require manual labelling for the training stage), the techniques described herein can be scaled to a large number (e.g., millions) of new customer workspaces.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for determining scores that are usable to filter a larger set of metrics (e.g., thousands of metrics) down to a smaller set of relevant metrics (e.g., hundreds of metrics) that can be more efficiently queried and ingested for root-cause analysis purposes when a particular type of incident occurs. To determine the scores, the system implements a training stage during which the system analyzes known incidents of the particular type. Moreover, the system converts the names of the metrics, as defined by customer-defined words or string(s) of alphanumeric characters that describe the metrics, into mathematical representations (e.g., word embedding featurization vectors).

When a new metric with a new name is received in association with a new incident of the particular type, the system implements an incident inference stage during which the new name is also converted into a new mathematical representation. The system then compares the new mathematical representation to the mathematical representations generated during the training stage to identify a similar mathematical representation. The system then retrieves the score for the metric associated with the similar mathematical representation and assigns the retrieved score to the new metric. The term "new" in this context reflects the fact that the information is not included in or part of the training stage.

Various examples, scenarios, and aspects of the disclosed techniques are described below with reference to FIGS. 1-7.

Figure 1:
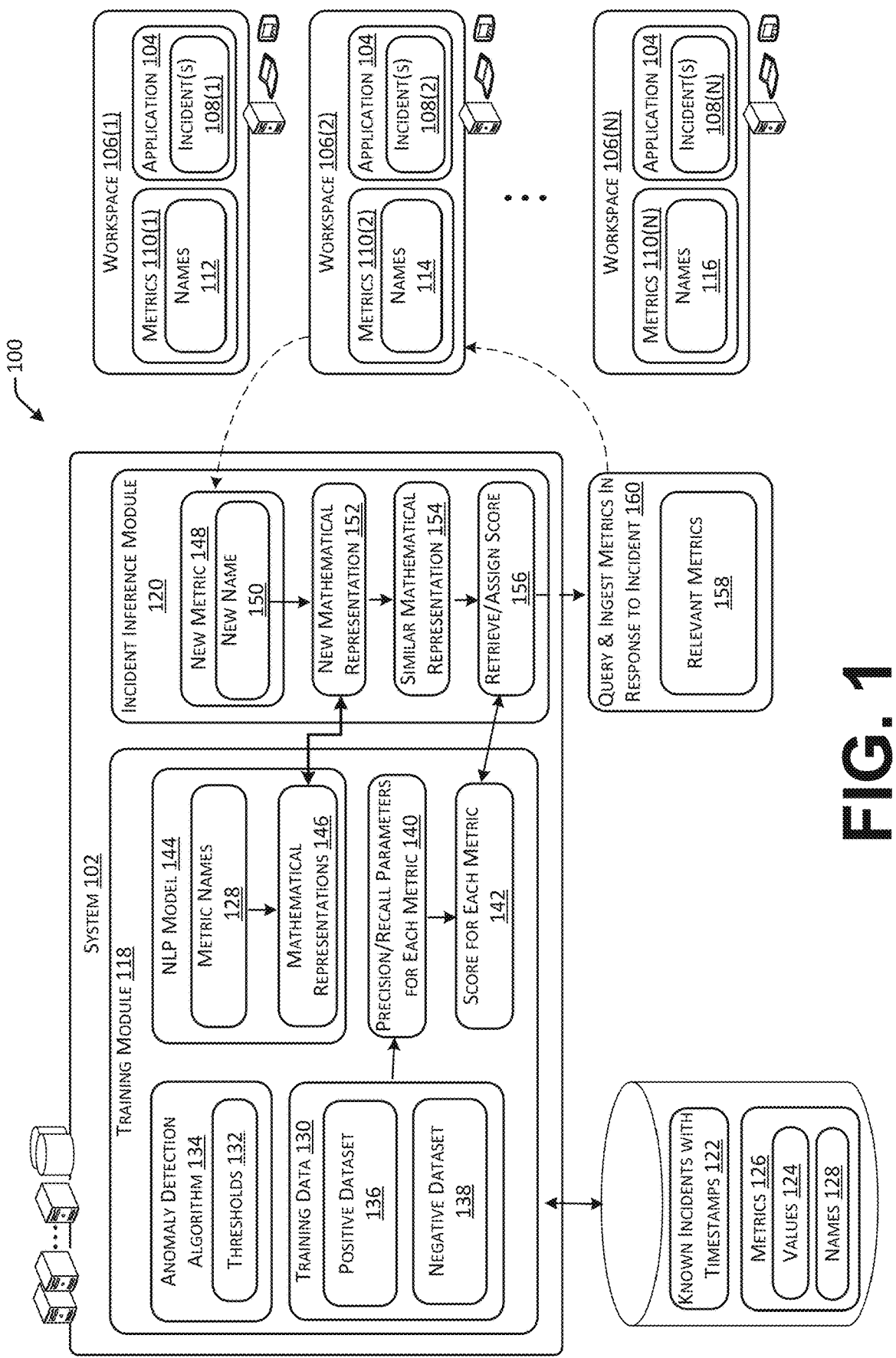
FIG. 1 illustrates an example environment in which a system can determine scores that are usable to filter a larger set of metrics (e.g., thousands of metrics) down to a smaller set of relevant metrics (e.g., hundreds of metrics) that can be more efficiently queried and ingested for root-cause analysis purposes when a particular type of incident occurs.

FIG. 1 is a diagram illustrating an example environment 100 in which a system 102 can determine scores that are usable to filter a larger set of metrics (e.g., thousands of metrics) down to a smaller set of relevant metrics (e.g., hundreds of metrics) that can be more efficiently queried and ingested (e.g., investigated) for root-cause analysis purposes when a particular type of incident occurs. As described above, a cloud provider can provision an application 104 for use by different customers within separate workspaces 106 (1-N). A workspace 106(1-N) is a logical unit that belongs to the customer and that enables the customer to efficiently configure resources, manage applications, and execute services in a customized and secure manner. In one example, the cloud provider can provision the application to separate workspaces 106(1-N) via a container-based orchestration process (e.g., KUBERNETES).

Often, execution of the application 104 in workspaces 106(1-N) may be disrupted by incidents 108(1-N) that negatively affect the performance of the application 104 within the workspaces 106(1-N) and/or the security provided by the application within the workspaces 106(1-N). When the incidents 108(1-N) occur, the cloud provider is often required, e.g., in accordance with various service level agreements (SLAs), to investigate the incidents 108(1-N) and perform root-cause analysis.

In order to perform the root-cause analysis, a cloud provider operates the system 102, which is configured to query and/or ingest metrics 110(1-N) from the workspaces 106(1-N). The metrics 110(1-N) reflect a state of the application 104 and/or the infrastructure used to execute the application 104. As described above, while the larger set of metrics 110(1-N) available for querying and ingestion are essentially the same across the workspaces 106(1-N), the names given to the metrics vary from one workspace to the next. Accordingly, FIG. 1 illustrates that the metrics 110(1) reflecting the state of the application 104 in workspace 106(1) have a first group of names 112. Moreover, FIG. 1 illustrates that the metrics 110(2) reflecting the state of the application 104 in workspace 106(2) have a second group of names 114. Finally, FIG. 1 illustrates that the metrics 110(N) reflecting the state of the application 104 in workspace 106(N) have an Nth group of names 116.

To improve the way in which incidents can be queried and ingested, the system 102 includes a training module 118 to implement a training stage and an incident inference module 120 to implement an incident inference stage. The number of illustrated modules is just an example, and the number can vary higher or lower. That is, functionality described herein in association with the illustrated modules can be performed by a fewer number of modules or a larger number of modules on one device or spread across multiple devices.

The training module 118 is configured to access data associated with known incidents 122 (e.g., incidents 108(1)) that occur within a workspace of a customer (e.g., workspace 106(1)). The known incidents can be of a particular type of incident. For example, a first type of incident may be related to security. A second type of incident may be related to networking and the transmission of data. A third type of incident may be related to the processing of data and execution environments. A fourth type of incident may be related to the storage and maintenance of data. These example types of incidents are non-exhaustive, and the techniques described herein can be applied to other types of incidents. Further, an incident can be classified in more than one type (e.g., a storage incident can also be a security incident). The data includes respective times at which the known incidents 122 occur (e.g., captured by timestamps), respective values 124 (e.g., time-series values) for a large set of metrics 126 (e.g., metrics 110(1)), and respective names 128 (e.g., names 112) for the metrics 126 as defined by the customer (e.g., an Information Technology (IT) representative of the customer).

Using the accessed data associated with the known incidents 122, the training module 118 is configured to generate training data 130. As described herein, the training data 130 is useable to determine a score for each of the metrics 126, and the score indicates the relevance of a metric 126 to a particular type of incident. The training module 118 generates the training data 130 by determining, for each known incident 122, whether a value 124 for each metric 126 is above or below a threshold 132 (e.g., a threshold value) configured by an anomaly detection algorithm 134 within a predefined time period immediately before a time at which the incident 122 occurs, as determined via a timestamp. In one example, this predefined time period is from two to six hours. During this predefined time period there is an expectation that the values 124 of a metric 126 that is relevant to the incident would behave in an abnormal, or anomalous, manner. Stated alternatively, there is an expectation that the values 124 of a metric 126 that is relevant to the incident would spike above a higher threshold value established for the metric 126 and/or dip below a lower threshold value established for the metric 126. If the values 124 of the metric 126 are determined to be above or below one of the threshold value(s) within the predefined time period, the training module 118 adds the metric 126 to a positive dataset 136 in the training data 130.

Similarly, the training module 118 generates the training data 130 by determining, for each known incident 122, whether a value 124 for each metric 126 is above or below a threshold 132 (e.g., threshold value) configured by the anomaly detection algorithm 134 during another predefined time period immediately before the predefined time period discussed in the preceding paragraph. In one example, this other predefined time period is from two to six hours. In another example, this other predefined time period can be from one to three days. During this other predefined time period, there is an expectation that the values 124 of a metric 126 that is relevant to the incident would behave in a normal, or non-anomalous, manner. Stated alternatively, there is an expectation that the values 124 of a metric 126 that is relevant to the incident would not spike above a higher threshold value established for the metric 126 and/or would not dip below a lower threshold value established for the metric 126. If the values 124 of the metric 126 are determined to be above or below a threshold value within this other predefined time period, the training module 118 adds the metric 126 to a negative dataset 138 in the training data 130.

The predefined time periods described above are non-overlapping and can be established based on the particular type of incident. Thus, the predefined time periods can vary from one type of incident to the next. It is noted that a metric 126 can be added to both the positive dataset 136 and the negative dataset 138 (e.g., if the metric spikes and/or dips in both predefined time periods).

The anomaly detection algorithm 134 establishes the thresholds 132 (e.g., threshold values) for individual metrics. In one example, the anomaly detection algorithm 134 is a dynamic anomaly detection algorithm that implements time-based adjustments to a range of accepted or expected values for a metric over time by learning a higher threshold value to define the top of the range and a lower threshold value to define the bottom of the range. In another example, the anomaly detection algorithm 134 can use static thresholds to define the higher threshold value and/or the lower threshold value.

The training module 118 is configured to analyze the training data 130 to determine the relevance of individual metrics 126 to a particular type of incident, as captured via scores. In one example, the training module 118 determines a precision parameter and a recall parameter for each metric 126, as captured via reference 140. The precision parameter is a fraction represented by a number of times a metric 126 is seen in the positive dataset 136 over a total number of times the metric 126 is seen in both the positive dataset 136 and negative dataset 138. The recall parameter is a fraction represented by a number of times a metric 126 is seen in the positive dataset 136 over a total number of known incidents 122 analyzed. The training module 118 is configured to combine the precision parameter (Precision) and recall parameter (Recall) into a score for each metric, as captured via reference 142. In one example, the score is an F-score that balances both precision and recall and is calculated as: F-score=2*(Precision*Recall)/(Precision+Recall).

As described above, in the context of different workspaces 106(1-N) for different customers, names for the same or similar metrics 110(1-N) that reflect the status of the same application 104 may be vastly different as they are defined by different users. For instance, one workspace 106(1) may broadly name a metric as "error_count" while another workspace may capture "error_count" based on type via more granular names as follows:

"afss_file_fetch_error_count",
"configmanager_activateconfigsetrevision_error_count_total", and
"configmanager_createconfigset_error_count_total".

Accordingly, the training module 118 uses a natural language processing (NLP) model 144 to represent the names 128 of the metrics 126 mathematically, or as mathematical representations 146. In one example, the mathematical representations 146 are word embedding featurization vectors. To this end, the natural language processing model 144 can use a natural language processing algorithm such as term frequency-inverse document frequency (TF-IDF), FastText, One Hot Encoding, Word2Vec, and so forth.

The natural language processing model 144 can be trained to map words and/or other strings of alphanumeric characters used to define a metric name 128 to a linguistic context and to produce a vector space that includes the word embedding featurization vectors. The word embedding featurization vectors are positioned, in the vector space, so that names that are more likely to share common linguistic contexts are located in close proximity to one another. Consequently, the natural language processing model 144 is configured to map different, but similar metric names 128 to the same linguistic context.

The incident inference module 120 implements the incident inference stage when a new metric 148 with a new name 150 is received in association with a new incident (e.g., incident 108(2) of the particular type from a new workspace 106(2)). The incident inference module 120 calls on the natural language processing model 144 to convert the new name 150 into a new mathematical representation 152. The incident inference module 120 then compares the new mathematical representation 152 for the new name 150 of the new metric 148 to the mathematical representations 146 of the metrics 126 that have already been scored during the training stage. The comparison identifies a similar mathematical representation 154 for the new mathematical representation 152. The incident inference module 120 can then retrieve a score for the metric 126 associated with the similar mathematical representation 154 and assign the retrieved score to the new metric 148, as captured via reference 156. The process implemented by the incident inference module can be reiterated for different new metrics 148 that are available to be queried and ingested.

In various examples, new metrics with new names are received from a customer workspace (e.g., workspace 106(2)) that is different than a customer workspace (e.g., workspace 106(1)) from which the known incidents 122 were received and analyzed. Consequently, the incident inference module 120 can efficiently assign scores to the new metrics with new names without having to implement the training stage described above. This enables the incident inference module 120 to efficiently rank the new metrics based on relevance (e.g., the assigned scores) to the particular type of incident and use the ranking to filter a larger set of metrics 110(2) (e.g., thousands of metrics) down to a smaller set of metrics 158 (e.g., hundreds of metrics) that are relevant to the particular type of incident. For example, the incident inference module 120 can use a threshold score (e.g., a score over 0.90, 0.80, 0.75, and so forth) and/or a threshold number N (e.g., the top N=100 scored metrics, the top N=200 scored metrics, the top N=300 scored metrics, and so forth) to determine the smaller set of relevant metrics. The incident inference module 120 can then focus the querying and ingestion of metrics 160 to this smaller set of metrics 158 in order to improve the response time to return results of the root-cause analysis.

Consequently, the system 102 described herein address the challenges presented when the names of the same or similar metrics vary from one customer workspace to another and/or a number of customers for which there is data for the training stage is limited. Moreover, because the system is fully automated (e.g., does not require manual labelling for the training stage), the techniques described herein can be scaled to a large number (e.g., millions) of new customer workspaces.

Figure 2:
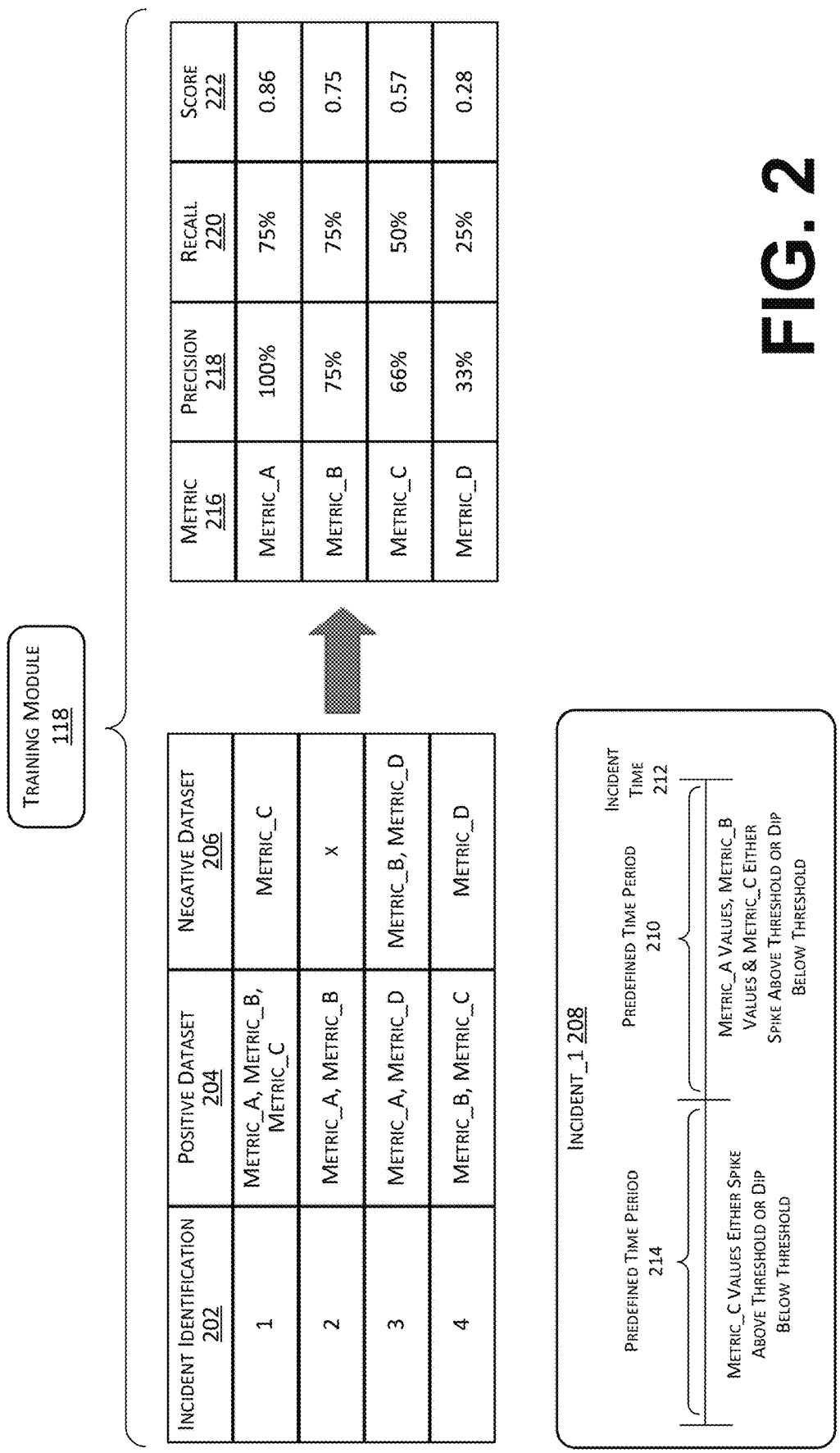
FIG. 2 is a diagram illustrating the training stage that produces scores for an example set of metrics.

FIG. 2 is a diagram illustrating the training stage, as implemented by the training module 118, that produces scores for an example set of metrics. The table on the left side of FIG. 2 includes a column 202 that includes identifications for separate known incidents 122, a column 204 that includes identifications (e.g., names) of metrics added to the positive dataset 136 on a per incident basis, and a column 206 that includes identifications (e.g., names) of metrics added to the negative dataset 138 on a per incident basis. The number of incidents and/or metrics used in this example is small (e.g., four incidents and four metrics) for ease of discussion. It is understood in the context of this disclosure that a larger number of known incidents can be analyzed during the training stage and/or a larger number of metrics (e.g., thousands) would be analyzed during the training stage.

As shown in FIG. 2, "Metric_A", "Metric_B", and "Metric_C" have been added to the positive dataset 136, while "Metric_C" has been added to the negative dataset 138 for incident "1". Additionally, "Metric_A" and "Metric_B" have been added to the positive dataset 136, while no metric (as represented by the "x") has been added to the negative dataset 138 for incident "2". Further, "Metric_A" and "Metric_D" have been added to the positive dataset 136, while "Metric_B" and "Metric_D" have been added to the negative dataset 138 for incident "3". Finally, "Metric_B" and "Metric_C" have been added to the positive dataset 136, while "Metric_D" has been added to the negative dataset 138 for incident "4".

As shown in the example timing element 208 for incident "1" shown below the table, the anomaly detection algorithm 134 has determined that "Metric_A", "Metric_B", and "Metric_C" each have values determined to be above or below a threshold during a predefined time period 210 (e.g., two hours, three hours, four hours, five hours, six hours) immediately before a time 212 when the incident occurs (e.g., when the incident starts). During this predefined time period 210 leading up to the time 212 of the incident there is an expectation that the values of metrics that are relevant to the incident would behave in an abnormal, or anomalous, manner (e.g., signaling an issue).

Similarly, the anomaly detection algorithm 134 has determined that "Metric_C" has values determined to be above or below a threshold during a predefined time period 214 (e.g., two hours, three hours, four hours, five hours, six hours, a day, two days, three days) immediately before the predefined time period 210. During this predefined time period 214, which may be the same or longer than predefined time period 210 and which is removed from the time 212 of the incident (i.e., further away from the time 212 when compared to predefined time period 210), there is an expectation that the values of metrics that are relevant to the incident would behave in a normal, or non-anomalous, manner.

The table on the right side of FIG. 2 includes a column 216 for the different metrics, a column 218 for the precision parameter, a column 220 for the recall parameter, and a column 222 for the score.

The precision parameter is a fraction represented by a number of times a metric is seen in the positive dataset 136 over a total number of times the metric is seen in both the positive dataset 136 and negative dataset 138. Consequently, the training module 118 calculates a precision parameter of 100% for "Metric_A" based on the table on the left side of FIG. 2. That is, "Metric_A" is seen three times in the positive dataset 136 and "Metric_A" is seen a total number of three times in both the positive dataset 136 and negative dataset 138. The training module 118 calculates a precision parameter of 75% for "Metric_B" based on the table on the left side of FIG. 2. That is, "Metric_B" is seen three times in the positive dataset 136 and "Metric_B" is seen a total number of four times in both the positive dataset 136 and negative dataset 138. The training module 118 calculates a precision parameter of 66% for "Metric_C" based on the table on the left side of FIG. 2. That is, "Metric_C" is seen two times in the positive dataset 136 and "Metric_C" is seen a total number of three times in both the positive dataset 136 and negative dataset 138. Finally, the training module 118 calculates a precision parameter of 33% for "Metric_D" based on the table on the left side of FIG. 2. That is, "Metric_D" is seen one time in the positive dataset 136 and "Metric_D" is seen a total number of three times in both the positive dataset 136 and negative dataset 138.

As mentioned above, the recall parameter is a fraction represented by a number of times a metric is seen in the positive dataset 136 over a total number of known incidents 122 analyzed. Consequently, the training module 118 calculates a recall parameter of 75% for "Metric_A" based on the table on the left side of FIG. 2. That is, "Metric_A" is seen three times in the positive dataset 136 and there is a total number of four incidents analyzed. The training module 118 calculates a recall parameter of 75% for "Metric_B" based on the table on the left side of FIG. 2. That is, "Metric_B" is seen three times in the positive dataset 136 and there is a total number of four incidents analyzed. The training module 118 calculates a recall parameter of 50% for "Metric_C" based on the table on the left side of FIG. 2. That is, "Metric_C" is seen two times in the positive dataset 136 and there is a total number of four incidents analyzed. Finally, the training module 118 calculates a recall parameter of 25% for "Metric_D" based on the table on the left side of FIG. 2. That is, "Metric_D" is seen one time in the positive dataset 136 and there is a total number of four incidents analyzed.

The training module 118 is configured to combine the precision parameter (Precision) and recall parameter (Recall) into a score for each metric. In one example, the score is an F-score that balances both precision and recall and is calculated as: F-score=2*(Precision*Recall)/(Precision+Recall). Accordingly, as shown in FIG. 2 via the score column 222, the training module 118 calculates an F-score of "0.86" for "Metric_A", an F-score of "0.75" for "Metric_B", an F-score of "0.57" for "Metric_C", and an F-score of "0.28" for "Metric_D".

Figure 3:
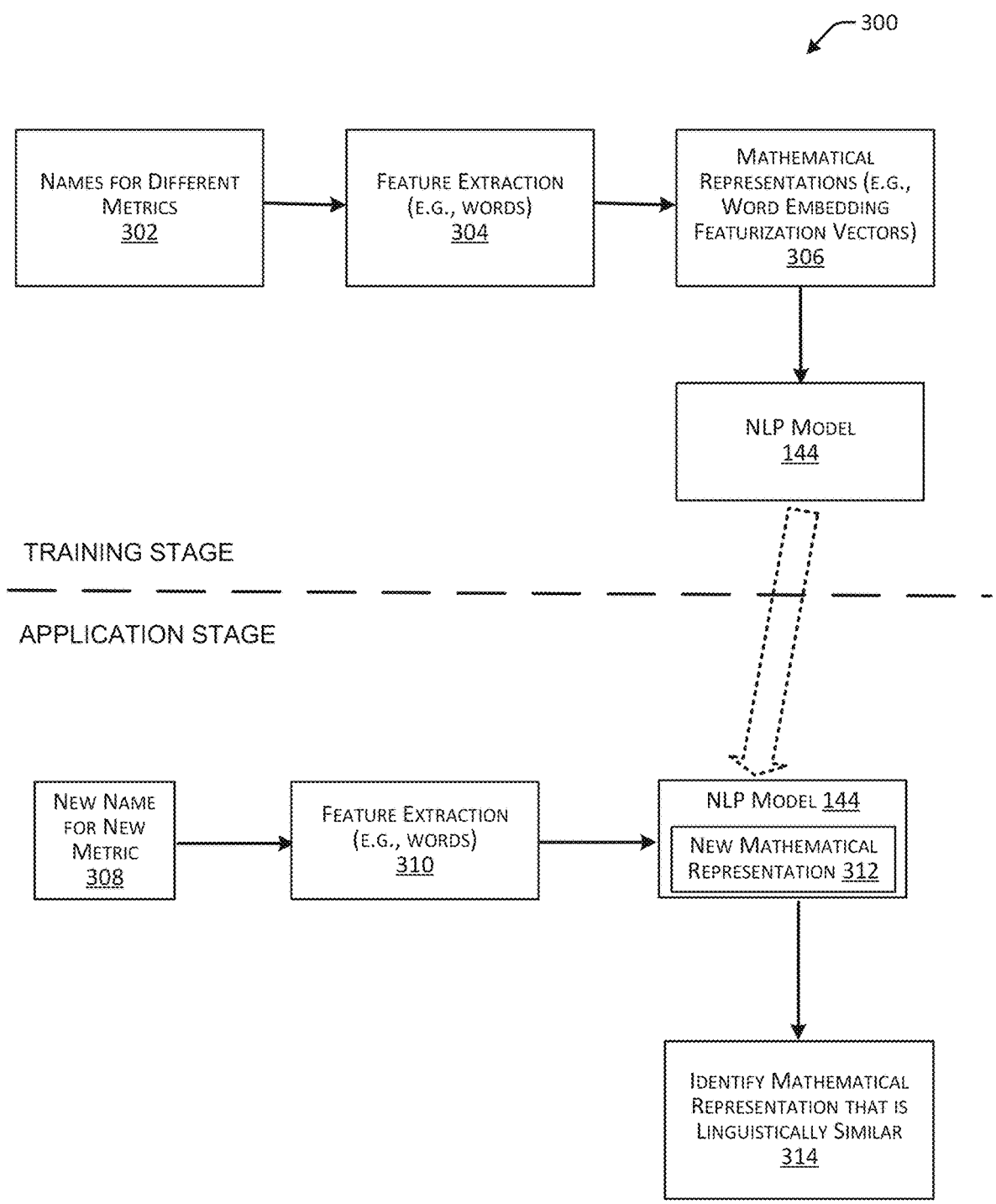
FIG. 3 is a block diagram illustrating a training stage and an application stage for the natural language processing model used to correlate different, but similar, names to the same metric.

FIG. 3 is a block diagram illustrating a training stage and an application stage for the natural language processing model 144 used to correlate different, but similar, names to the same metric. During the training stage, the natural language processing model 144 can be learned by using, as a training data set, names for different metrics 302 associated with known incidents 122. The training module 118 performs feature extraction 304 on the names of the metrics 302 and uses the extracted features 304 to generate mathematical representations 306 (e.g., word embedding featurization vectors) useable to train the natural language processing model 144.

Consequently, the natural language processing model 144 is trained to map words and/or other strings of alphanumeric characters used in a name to a linguistic context. The natural language processing model 144 may use neural networks to produce word embedding featurization vectors and to construct the linguistic contexts of the words and/or other strings of alphanumeric characters used in the names. The natural language processing model 144 can produce a vector space that includes the word embedding featurization vectors and that positions the word embedding featurization vectors so that names that are more likely to share common linguistic contexts are located in close proximity to one another. Consequently, the natural language processing model 144 is configured to map different names to the same or similar linguistic context and to determine metrics that are similar based on the names.

After the training stage is complete, the natural language processing model 144 is called on in the application stage to perform the inference task. That is, provided a new name for a new metric 308, the training module 118 implements feature extraction 310 on the name of the new metric 308 and applies the natural language processing model 144 in order to generate a new mathematical representation 312 and to compare the new mathematical representation to the mathematical representations 306. Accordingly, the natural language processing model 144 can identify a mathematical representation 306 that is linguistically similar 314 to the new mathematical representation 312. For instance, the natural language processing model 144 can compute a cosine distance between a new word embedding featurization vector and each word embedding featurization vector generated during the training stage. The lowest cosine distance computed yields the word embedding featurization vector that is most similar to the new word embedding featurization vector.

Figure 4:
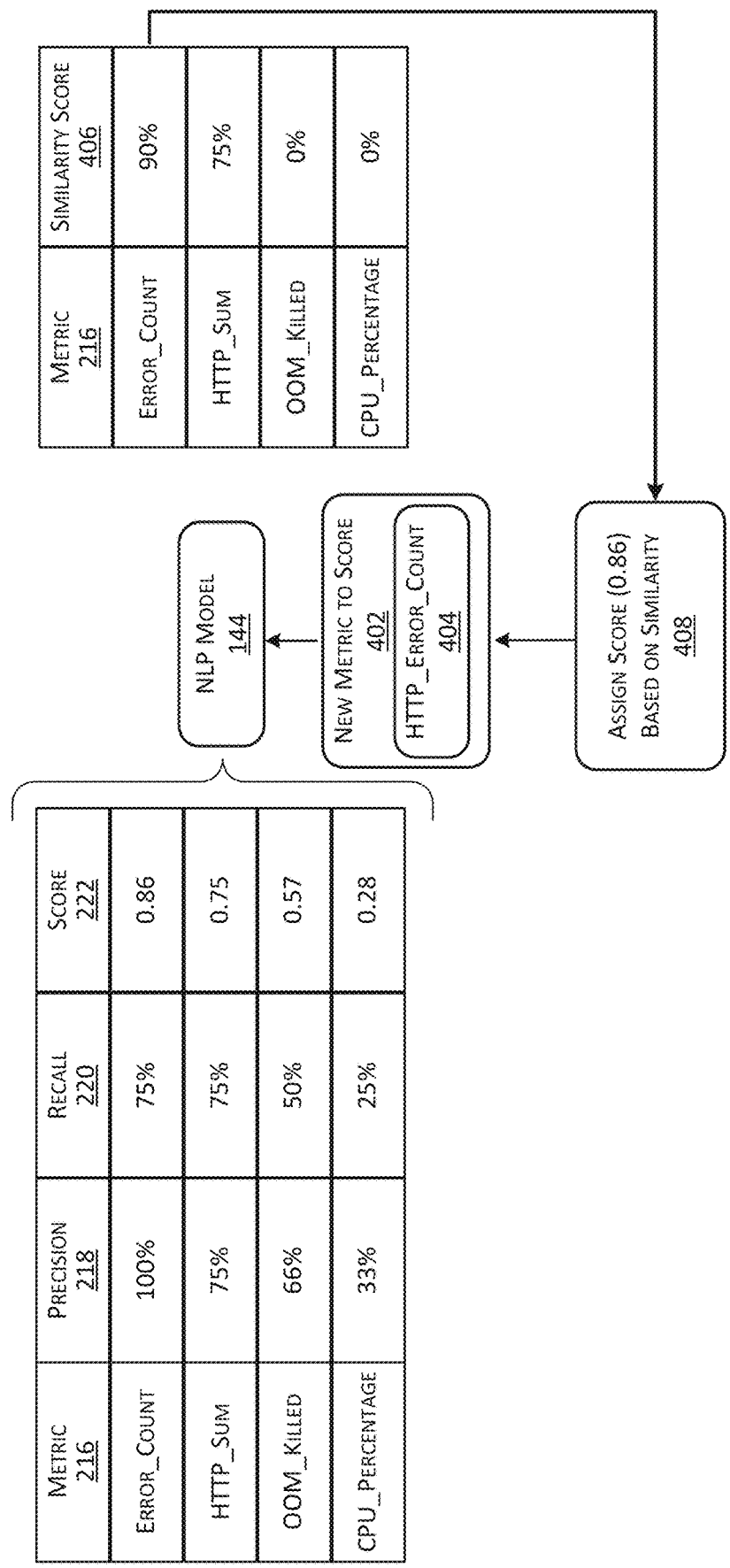
FIG. 4 is a diagram illustrating the incident inference stage that assigns a score to a new metric.

FIG. 4 is a diagram illustrating the incident inference stage that assigns a score to a new metric. The table on the left side of FIG. 4 is similar to the table on the right side of FIG. 2, except the following metrics names-"Error_Count", "HTTP_Sum", "OOM_Killed", "CPU_Percentage"—have respectively replaced the use of "Metric_A", "Metric_B", "Metric_C", and "Metric_D". In accordance with the discussion above, the natural language processing model 144 is configured to generate mathematical representations for each of "Error_Count", "HTTP_Sum", "OOM_Killed", and "CPU_Percentage" as part of the training stage. As shown in FIG. 4, the incident inference module 120 receives a new metric to score 402 with a name "HTTP Error_Count" 404. The natural language processing model 144 generates a new mathematical representation for the name "HTTP Error_Count" 404 and compares the new mathematical representation to the mathematical representations generated during the training stage. The comparison yields similarity scores 406 (e.g., established based on a cosine distance between two vectors) as shown in the table on the right side of FIG. 4.

The metric that has the mathematical representation with the highest similarity score (e.g., "Error_Count") is then identified and its score (e.g., "0.86") is retrieved and assigned 408 to the new metric that is to be scored 402. In various examples where a single metric includes multiple different scores which have been established in the training stage for multiple different workspaces, the assigned score can be an average of the multiple different scores. Alternatively, the assigned score can be the highest score in the multiple different scores.

Figure 5A:
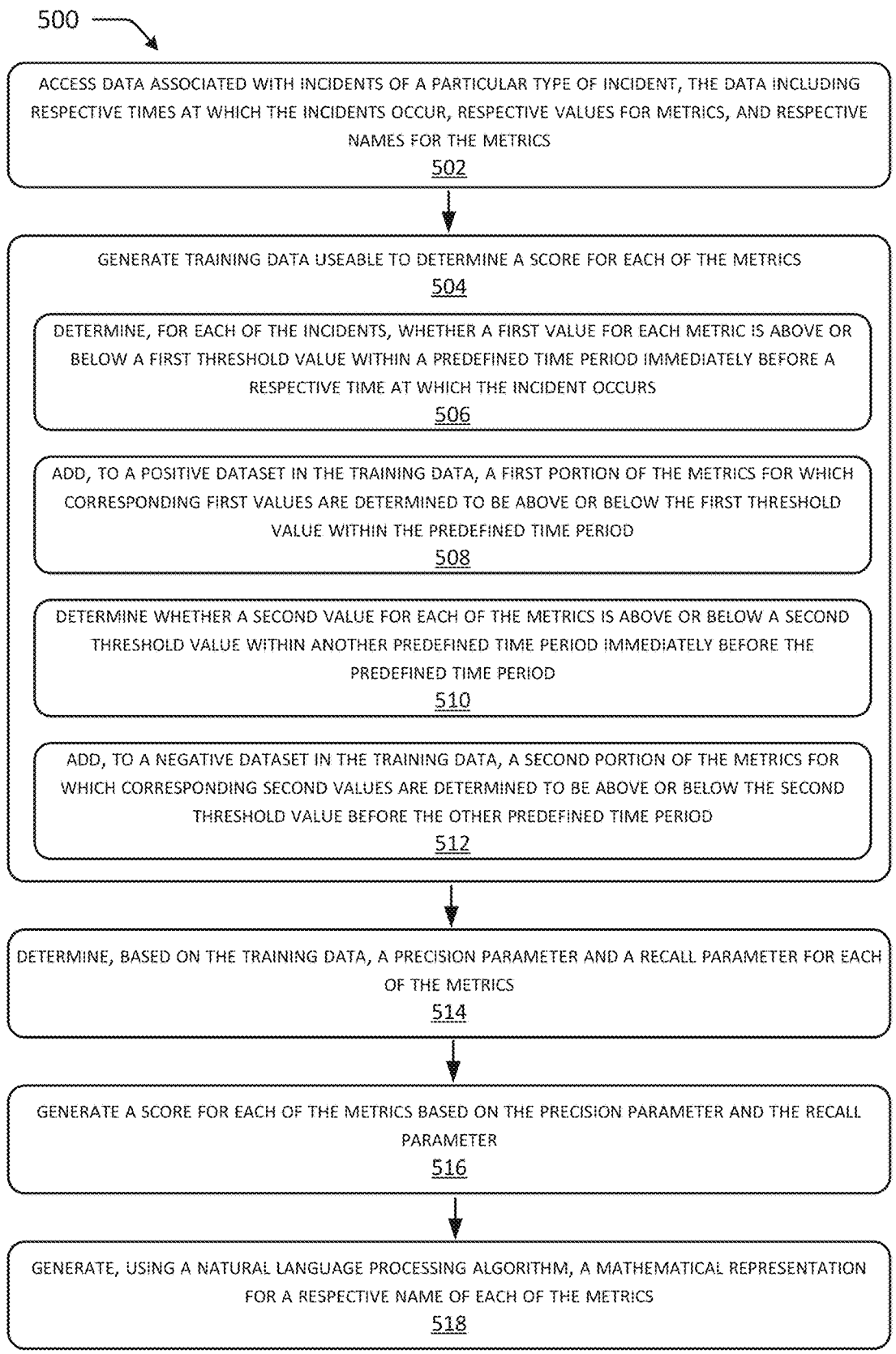
FIGS. 5A and 5B include a flow diagram of an example method for determining scores that are usable to filter a larger set of metrics (e.g., thousands of metrics) down to a smaller set of relevant metrics (e.g., hundreds of metrics) that can be more efficiently queried and ingested for root-cause analysis purposes when a particular type of incident occurs.
Figure 5B:
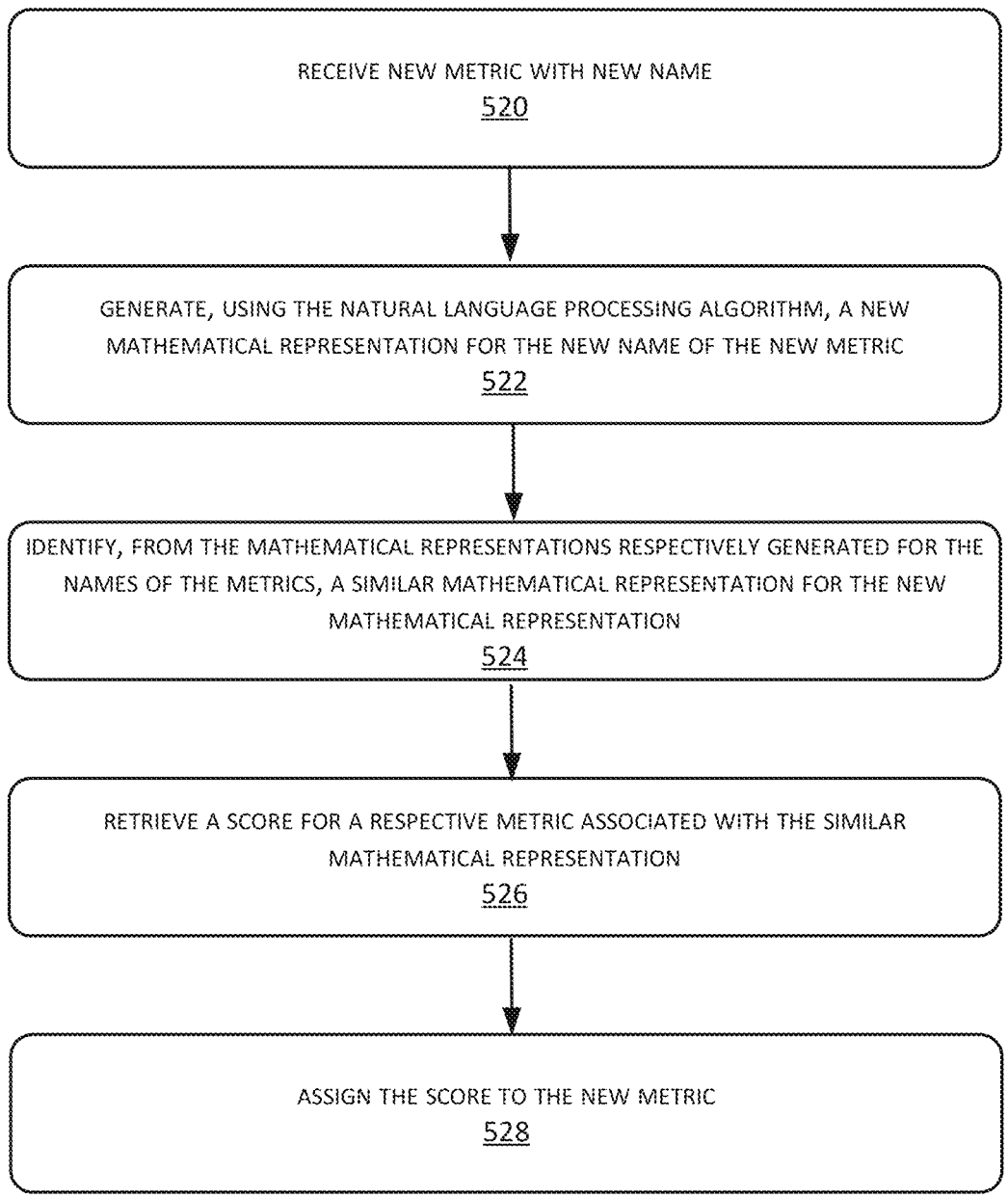

Proceeding to FIGS. 5A and 5B, aspects of a method 500 for determining scores that are usable to filter a larger set of metrics (e.g., thousands of metrics) down to a smaller set of relevant metrics (e.g., hundreds of metrics) that can be more efficiently queried and ingested for root-cause analysis purposes when a particular type of incident occurs are shown and described. With respect to FIG. 5A, the process 500 begins at operation 502 where a system initiates the training stage by accessing data associated with incidents of a particular type of incident. As described above, the data includes respective times at which the incidents occur, respective values for metrics, and respective names for the metrics.

At operation 504, the system generates training data useable to determine a score for each of the metrics. As described above, the score indicates relevance of the metric to the particular type of incident. Moreover, as shown in FIG. 5A, generating the training data includes operations 506, 508, 510, and 512.

At operation 506, the system determines, for each incident of the incidents, whether a first value for each of the metrics is above or below a first threshold value within a predefined time period immediately before a respective time at which the incident occurs.

At operation 508, the system adds, to a positive dataset in the training data, a first portion of the metrics for which corresponding first values are determined to be above or below the first threshold value within the predefined time period.

At operation 510, the system determines whether a second value for each metric of the metrics is above or below a second threshold value within another predefined time period immediately before the predefined time period.

At operation 512, the system adds, to a negative dataset in the training data, a second portion of the metrics for which corresponding second values are determined to be above or below the second threshold value before the other predefined time period.

At operation 514, the system determines, based on the training data, a precision parameter and a recall parameter for each of the metrics.

At operation 516, the system generates a score for each of the metrics based on the precision parameter and the recall parameter.

At operation 518, the system generates, using a natural language processing algorithm, a mathematical representation for a respective name of each of the metrics.

In FIG. 5B, the system initiates the incident inference stage at operation 520, where in association with a new incident, a new metric with a new name is received.

At operation 522, the system generates, using the natural language processing algorithm, a new mathematical representation for the new name of the new metric.

At operation 524, the system identifies, from the mathematical representations respectively generated for the names of the metrics, a similar mathematical representation for the new mathematical representation.

At operation 526, the system retrieves a score for a respective metric associated with the similar mathematical representation.

At operation 528, the system assigns the score to the new metric.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
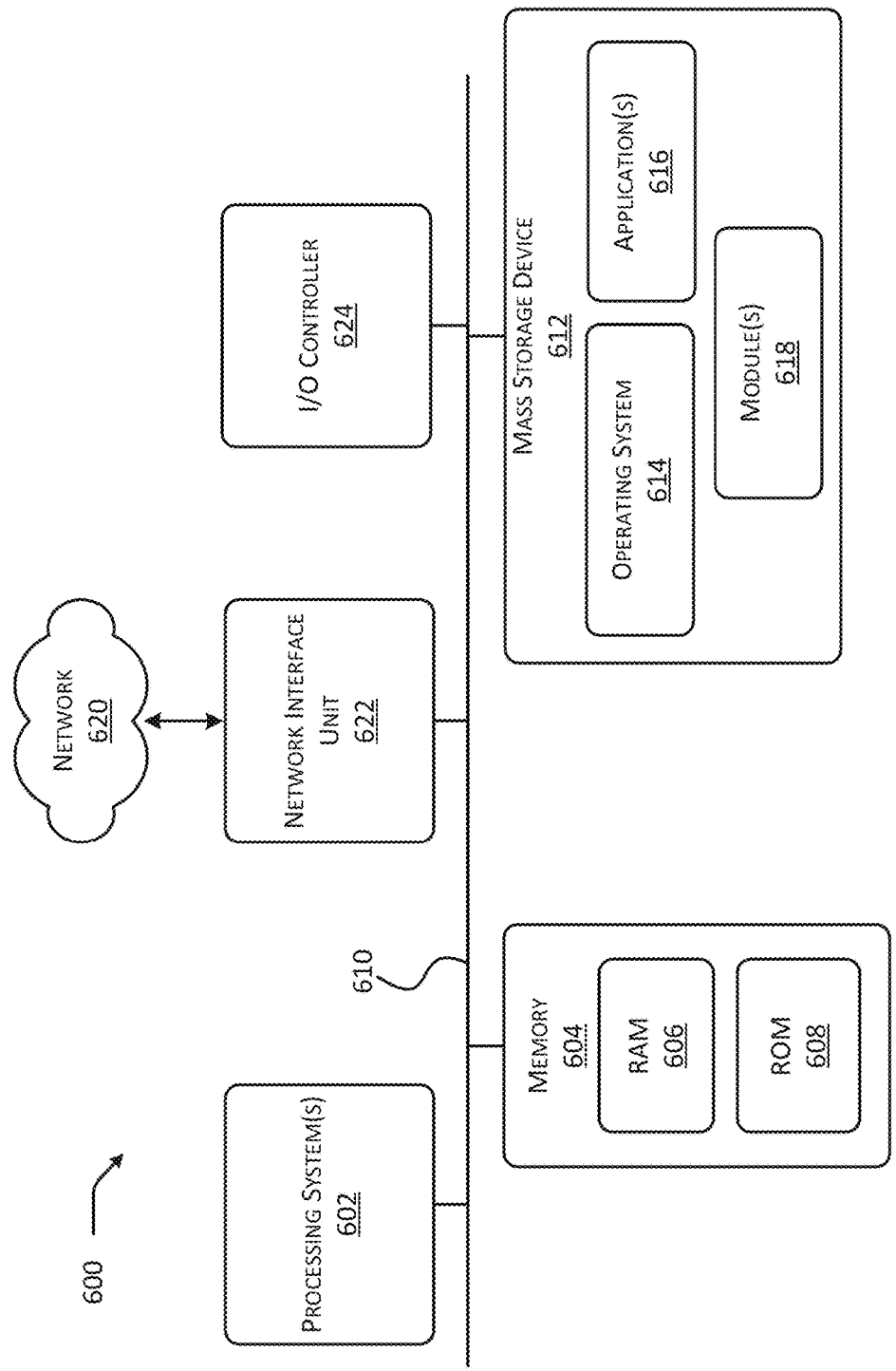
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 102, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
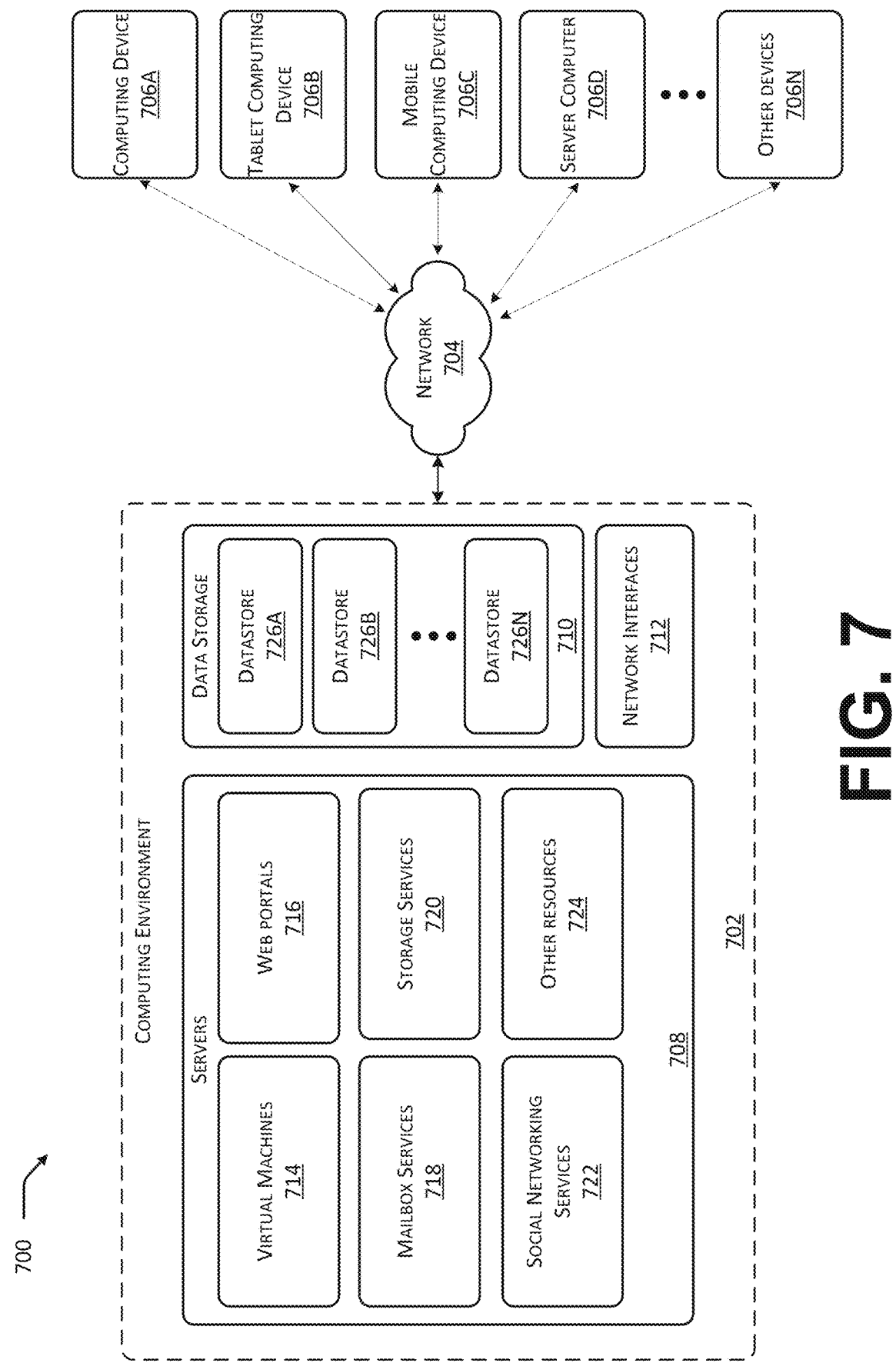
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different workspaces).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    accessing data associated with incidents of a particular type of incident, wherein the data includes:
        respective times at which the incidents occur;
        respective values for metrics; and
        respective names for the metrics;
    generating training data useable to determine a score for each metric of the metrics, wherein:
        the score indicates relevance of the metric to the particular type of incident; and
        generating the training data includes, for each incident of the incidents:
            determining whether a first value for each metric of the metrics is above or below a first threshold value within a predefined time period immediately before a respective time at which the incident occurs;
            adding, to a positive dataset in the training data, a first portion of the metrics for which corresponding first values are determined to be above or below the first threshold value within the predefined time period;
            determining whether a second value for each metric of the metrics is above or below a second threshold value within another predefined time period immediately before the predefined time period; and
            adding, to a negative dataset in the training data, a second portion of the metrics for which corresponding second values are determined to be above or below the second threshold value before the other predefined time period;
    determining, based on the training data, a precision parameter and a recall parameter for each metric of the metrics;
    generating a score for each metric of the metrics based on the precision parameter and the recall parameter;
    generating, using a natural language processing algorithm, a mathematical representation for a respective name of each of the metrics;
    in association with a new incident:
        receiving a new metric with a new name;
        generating, using the natural language processing algorithm, a new mathematical representation for the new name of the new metric;
        identifying, from the mathematical representations respectively generated for the names of the metrics, a similar mathematical representation for the new mathematical representation;
        retrieving a score for a respective metric associated with the similar mathematical representation; and
        assigning the score to the new metric.

2. The method of claim 1, wherein the assigned score is useable to reduce a number of metrics to be queried as part of a root-cause analysis of the new incident.

3. The method of claim 1, wherein:
the incidents occur in a first workspace of a first customer;
the respective names for the metrics are defined by the first customer;
the new incident occurs in a second workspace of a second customer; and
the new name for the new metric is defined by the second customer.

4. The method of claim 1, wherein:
the natural language processing algorithm comprises term frequency-inverse document frequency (TF-IDF);
the mathematical representations generated for the respective names of the metrics comprise word embedding featurization vectors;
the new mathematical representation generated for the new name of the new metric comprises a new word embedding featurization vector; and
identifying the similar mathematical representation for the new mathematical representation comprises:
  computing a cosine distance between the new word embedding featurization vector and each word embedding featurization vector in the word embedding featurization vectors; and
  determining that the respective metric associated with the similar mathematical representation has a lowest cosine distance.

5. The method of claim 1, wherein the score generated for each metric of the metrics based on the precision parameter and the recall parameter comprises an F-score.

6. The method of claim 1, wherein the predefined time period and the other predefined time period are established based on the particular type of incident.

7. The method of claim 6, wherein the predefined time period is from two to six hours and the other predefined time period is from two to six hours.

8. The method of claim 1, wherein a dynamic anomaly detection algorithm is used to determine whether the first value for each metric of the metrics is above or below the first threshold value and to determine whether the second value for each metric of the metrics is above or below the second threshold value.

9. The method of claim 1, further comprising:
mapping the similar mathematical representation to multiple different scores for a same metric encountered in multiple different workspaces configured by multiple different customers; and
averaging the multiple scores to calculate the new score.

10. A system comprising:
a processing system; and
a computer-readable storage medium storing instructions that, when executed by the processing system, cause the system to perform operations comprising:
  accessing data associated with incidents of a particular type of incident, wherein the data includes:
    respective times at which the incidents occur;
    respective values for metrics; and
    respective names for the metrics;
  generating training data useable to determine a score for each metric of the metrics, wherein:
    the score indicates relevance of the metric to the particular type of incident; and
    generating the training data includes, for each incident of the incidents:
      determining whether a first value for each metric of the metrics is above or below a first threshold value within a predefined time period immediately before a respective time at which the incident occurs;
      adding, to a positive dataset in the training data, a first portion of the metrics for which corresponding first values are determined to be above or below the first threshold value within the predefined time period;
      determining whether a second value for each metric of the metrics is above or below a second threshold value within another predefined time period immediately before the predefined time period; and
      adding, to a negative dataset in the training data, a second portion of the metrics for which corresponding second values are determined to be above or below the second threshold value before the other predefined time period;
  determining, based on the training data, a precision parameter and a recall parameter for each metric of the metrics;
  generating a score for each metric of the metrics based on the precision parameter and the recall parameter; and
  generating, using a natural language processing algorithm, a mathematical representation for a respective name of each of the metrics.

11. The system of claim 10, wherein the operations further comprise, in association with a new incident:
receiving a new metric with a new name;
generating, using the natural language processing algorithm, a new mathematical representation for the new name of the new metric;
identifying, from the mathematical representations respectively generated for the names of the metrics, a similar mathematical representation for the new mathematical representation;
retrieving a score for a respective metric associated with the similar mathematical representation; and
assigning the score to the new metric.

12. The system of claim 11, wherein the assigned score is useable to reduce a number of metrics to be queried as part of a root-cause analysis of the new incident.

13. The system of claim 11, wherein:
the incidents occur in a first workspace of a first customer;
the respective names for the metrics are defined by the first customer;
the new incident occurs in a second workspace of a second customer; and
the new name for the new metric is defined by the second customer.

14. The system of claim 11, wherein:
the natural language processing algorithm comprises term frequency-inverse document frequency (TF-IDF);
the mathematical representations generated for the respective names of the metrics comprise word embedding featurization vectors;
the new mathematical representation generated for the new name of the new metric comprises a new word embedding featurization vector; and
identifying the similar mathematical representation for the new mathematical representation comprises:
  computing a cosine distance between the new word embedding featurization vector and each word embedding featurization vector in the word embedding featurization vectors; and determining that the respective metric associated with the similar mathematical representation has a lowest cosine distance.

15. The system of claim 11, wherein the score generated for each metric of the metrics based on the precision parameter and the recall parameter comprises an F-score.

16. The system of claim 11, wherein the predefined time period and the other predefined time period are established based on the particular type of incident.

17. The system of claim 11 wherein a dynamic anomaly detection algorithm is used to determine whether the first value for each metric of the metrics is above or below the first threshold value and to determine whether the second value for each metric of the metrics is above or below the second threshold value.

18. A computer-readable storage medium storing instructions that, when executed by a processing system, cause a system to perform operations comprising:
   accessing data associated with incidents of a particular type of incident, wherein the data includes:
      respective times at which the incidents occur;
      respective values for metrics; and
      respective names for the metrics;
   generating training data useable to determine a score for each metric of the metrics, wherein:
      the score indicates relevance of the metric to the particular type of incident; and
      generating the training data includes, for each incident of the incidents:
         determining whether a first value for each metric of the metrics is above or below a first threshold value within a predefined time period immediately before a respective time at which the incident occurs;
         adding, to a positive dataset in the training data, a first portion of the metrics for which corresponding first values are determined to be above or below the first threshold value within the predefined time period;
         determining whether a second value for each metric of the metrics is above or below a second threshold value within another predefined time period immediately before the predefined time period; and
         adding, to a negative dataset in the training data, a second portion of the metrics for which corresponding second values are determined to be above or below the second threshold value before the other predefined time period;
      determining, based on the training data, a precision parameter and a recall parameter for each metric of the metrics;
      generating a score for each metric of the metrics based on the precision parameter and the recall parameter; and
      generating, using a natural language processing algorithm, a mathematical representation for a respective name of each of the metrics.

19. The computer-readable storage medium of claim 18, wherein the operations further comprise, in association with a new incident:
   receiving a new metric with a new name;
   generating, using the natural language processing algorithm, a new mathematical representation for the new name of the new metric;
   identifying, from the mathematical representations respectively generated for the names of the metrics, a similar mathematical representation for the new mathematical representation;
   retrieving a score for a respective metric associated with the similar mathematical representation; and
   assigning the score to the new metric.

20. The computer-readable storage medium of claim 19, wherein:
   the incidents occur in a first workspace of a first customer;
   the respective names for the metrics are defined by the first customer;
   the new incident occurs in a second workspace of a second customer; and
   the new name for the new metric is defined by the second customer.

* * * * *